United States Patent [19]
Suzuki et al.

[11] Patent Number: 5,272,290
[45] Date of Patent: Dec. 21, 1993

[54] LEVER SWITCH DEVICE

[75] Inventors: Akira Suzuki; Masami Nagaya, both of Niwa, Japan

[73] Assignee: Kabushiki Kaisha Tokai-Rika-Denki-Seisakusho, Aishi, Japan

[21] Appl. No.: 907,532

[22] Filed: Jul. 2, 1992

[30] Foreign Application Priority Data

Jul. 12, 1991 [JP] Japan .................. 3-062673[U]

[51] Int. Cl.⁵ ................ H01H 9/00; H01H 19/00
[52] U.S. Cl. ................... 200/4; 200/61.54
[58] Field of Search ............. 200/61.27–61.38, 200/4, 61.54

[56] References Cited

U.S. PATENT DOCUMENTS

| | | | |
|---|---|---|---|
| 4,238,650 | 12/1980 | Cryer et al. | 200/4 |
| 4,273,971 | 6/1981 | Tregurtha | 200/4 |
| 4,379,954 | 4/1983 | Iwata et al. | 200/4 |
| 4,849,585 | 7/1989 | Vidican | 200/61.54 |
| 5,047,600 | 9/1991 | Enari et al. | 200/61.54 |

Primary Examiner—J. R. Scott
Attorney, Agent, or Firm—Oliff & Berridge

[57] ABSTRACT

A lever switch device has a lever, a shaft, a knob, a guide mechanism, a first switching device and a second switching device. The shaft defines a longitudinal axis and is disposed in the lever for rotation about the longitudinal axis and movable in an axial direction along the longitudinal axis. The knob is mounted on one end of the shaft to rotate and axially move the shaft. The guide mechanism allows the knob to rotate when the knob is in a first axial position along the longitudinal axis between a plurality of rotational positions within the first axial position. The guide mechanism further allows the knob to move to a second axial position along the longitudinal axis only when the knob is in a first predetermined one of the plurality of rotational positions. The guiding mechanism guides the knob when the knob is in the second axial position and is rotated, from the second axial position to a second predetermined one of the plurality of rotational positions within the first axial position. The first switching device actuated by the shaft switches between a first plurality of operational states when the knob is rotated between the plurality of rotational positions. The second switching device actuated by the shaft switches between a second plurality of operational states when the knob is moved between the first axial position and the second axial position.

18 Claims, 5 Drawing Sheets

LEVER SWITCH DEVICE

BACKGROUND OF THE INVENTION

1. Field of the Invention:

The present invention relates to a lever switch device capable of selecting either one of first and second switches by a single knob.

2. Description of the Related Art:

A lever switch device mounted to a vehicle steering column, for example, is known which is provided with a light switch actuating knob rotatably mounted to the leading end of a lever, and is actuated to change the light switch to any one of "OFF", "PARK" and "HEADLIGHT" positions in accordance with the rotation of the knob.

A switch device provided with a fog lamp is employed in the vehicle. However, this type of switch device is normally provided separately from the above lever switch device.

Since the lever switch device for actuating the light switch and the switch device for actuating a fog lamp switch have heretofore been provided separately, they can be operated independently.

In order to cope with the control that the fog lamp is not allowed to light when the head light is off, for example, an electric circuit has heretofore been used to achieve that control. However, since this control has not yet been achieved mechanically by a lever switch device, there is a demand for mechanical achievement of the above control by the lever switch device.

SUMMARY OF THE INVENTION

With the foregoing in view, it is therefore an object of the present invention to provide a lever switch device capable of mechanically making a changeover in a second switch only when a first switch is in a specific state.

According to one aspect of the present invention, there is provided a lever switch device comprising a lever, a shaft provided so as to be rotatable about its own axis and movable in a direction of its own axis, a knob attached to one end of the shaft so as to rotate and move integrally with the shaft, a guide mechanism for allowing the knob to rotate when the knob is in an axially-extending first position, allowing the knob to be moved between the first position and an axially-extending second position only when the knob is in a specific rotational position relative to the first position, and rotating the knob when the knob is in the second position to thereby move the knob to the first position, a first switch actuated through the shaft so as to switch states when the knob is rotated in a state in which the knob is in the first position, and a second switch actuated through the shaft so as to switch states when the knob is moved between the specific rotational position and the second position.

When the knob is rotated in the state in which the knob is in the first position, the first switch can be changed over by the shaft. When, on the other hand, the knob is moved in the axial direction in the state in which the knob has been turned to the specific rotational position relative to the first position, the knob is shifted from the first position to the second position, thereby making it possible to make a changeover in the second switch through the shaft. Accordingly, the second switch can be changed over only when the first switch is in a specific state.

On the other hand, when the knob is moved in the direction opposite the above direction in the state in which the knob is in the second position, the knob is shifted from the second position to the first position. Even when the knob is rotated in the state in which the knob is in the second position, the knob is moved from the second position to the first position.

The guide mechanism can include a protrusion which is rotated and moved integrally with the knob, and a defining portion disposed on the lever side and defines the range of rotation and movement of the protrusion.

The defining portion can be provided with a restricting portion which abuts against the protrusion so as to prevent the knob from being moved to the second position when the knob is in a position other than the specific rotational position relative to the first position, and an accommodating portion for allowing movement of the protrusion when the knob is in the specific rotational position relative to the first position so that at least one portion of the protrusion is accommodated in the accommodating portion.

Further, the accommodating portion and the above one portion can be provided with slanted portions respectively, which move the knob to the first position by a rotational force produced when the knob has been rotated in the state in which the knob is in the second position.

According to the present invention, as can be understood from the above description, the first switch is changed over depending on the rotational movement of the knob when the knob is in the first position. When the knob is moved in the axial direction of the shaft in the state in which the knob has been moved to the specific rotational position relative to the first position, the knob is shifted from the first position to the second position to thereby make a changeover in the second switch. Therefore, the second switch can be mechanically changed over only when the first switch is in the specific state.

Even if the knob is moved in the axial direction of the shaft and turned when the knob is in the second position, the knob can be shifted from the second position to the first position. It is also possible to provide an excellent operational characteristic.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Figure 4:
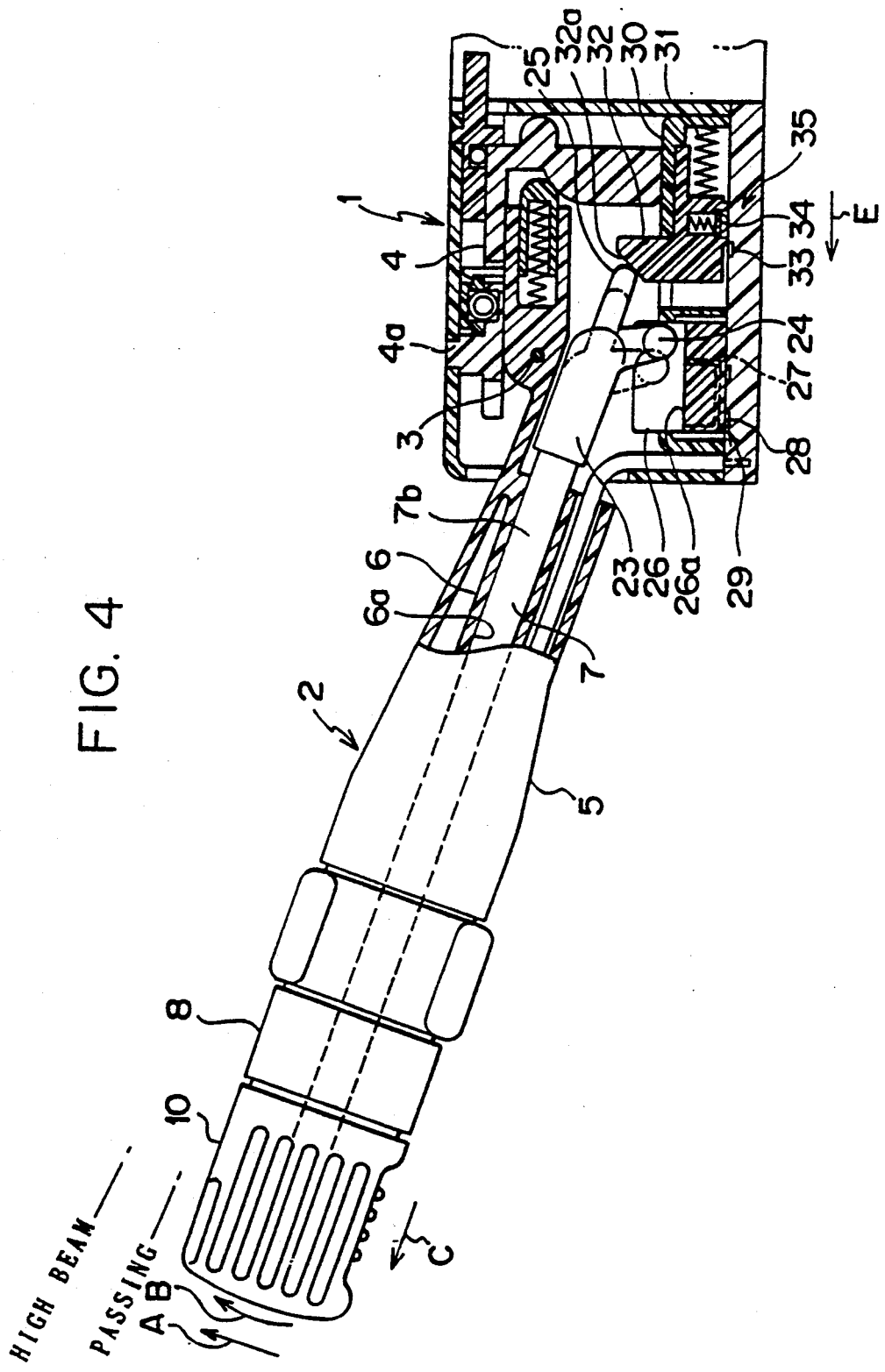
FIG. 4 is a partly cut-off sectional side view showing the lever switch device.

One embodiment of the present invention will hereinafter be described with reference to the accompanying drawings. Referring now to FIG. 4, a lever 2, which projects from a switch base 1, has a base end portion 10 which is supported by the switch base 1 via a shaft 3 so as to be rotatable in the direction indicated by arrow A and in the direction opposite thereto, and which is supported by the switch base 1 about a shaft portion 4a of a connecting member 4 so as to be rotatable in a direction (toward the front and rear sides) which intersects the direction indicated by arrow A.

Figure 2:
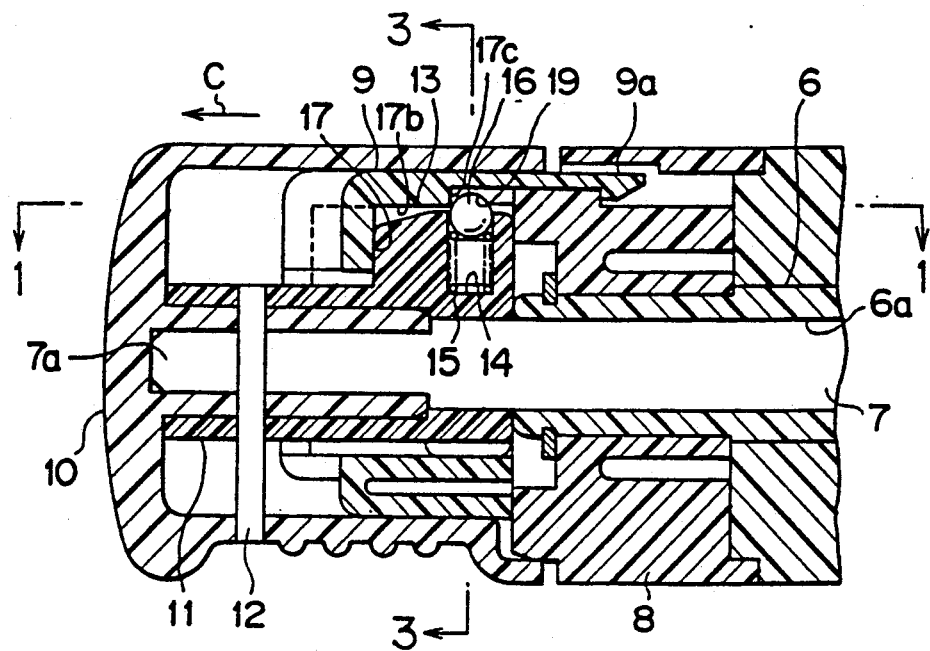
FIG. 2 is a fragmentary cross-sectional view showing the lever switch device.

A base 5 of the lever 2 includes a cylindrical portion 6 having an insertion hole 6a defined therein, which extends in the axial direction of the cylindrical portion 6. A shaft 7 is inserted into the insertion hole 6a in such a manner that it can be circumferentially rotated and axially moved. As shown in FIG. 2, an annular member 8 is fixed to the leading end of the cylindrical portion 6. A case 9 is fixedly mounted to the leading end of the annular member 8 by an engaging hook 9a.

The shaft 7 has a tip portion 7a as one end which extends through the case 9 and on which a knob 10 and a holder 11 are fixedly mounted by a pin 12. Thus, the knob 10 and the holder 11 can be rotated and moved integrally with the shaft 7 with respect to the lever 2. The knob 10 is disposed so as to cover the case 9. A protrusion 13, which projects from the outer peripheral surface of the holder 11, is disposed inside the case 9.

Figure 1:
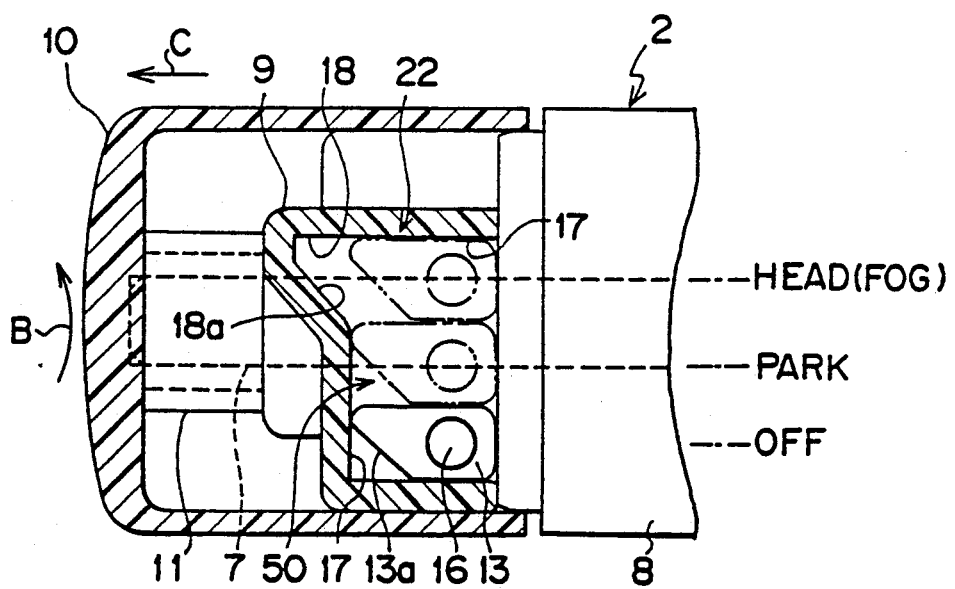
FIG. 1 is a cross-sectional view showing a main portion of a lever switch device according to one embodiment of the present invention, which is taken along line 1—1 of FIG. 2.

The leading end of the protrusion 13 of the holder 11 has a recess 14 defined therein. A compression coil spring 15 and a ball 16 are disposed in the recess 14. The ball 16 is urged by the compression coil spring 15 so as to be pressed against the inner surface of the case 9. In addition, the protrusion 13 has a slanted portion 13a formed on the left side thereof as seen in FIG. 1.

Figure 3:
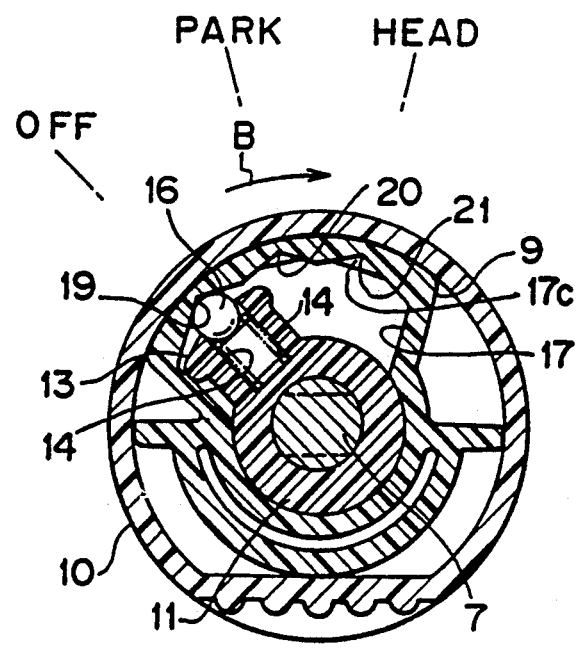
FIG. 3 is a fragmentary cross-sectional view showing the lever switch device taken along line 3—3 of FIG. 2.

On the other hand, the case 9 has an accommodating portion 50 defined therein, for accommodating the protrusion 13. As shown in FIG. 1, the accommodating portion 50 is formed with a restricting portion 17 and a run-off portion 18. The restricting portion 17 extends along the turning direction of the protrusion 13 and abuts against the left-hand end of the protrusion 13 so as to prevent the protrusion 13 from being moved to the left. The run-off portion 18 is provided in continuation with one end (upper end portion as seen in FIG. 1) of the restricting portion 17 and extends in the direction (i.e., in the left-hand direction) indicated by arrow C in FIG. 1. The run-off portion 18 is formed with a slanted portion 18a corresponding to the slanted portion 13a of the protrusion 13 and can accommodate the slanted portion 13a of the protrusion 13 thereat (see FIG. 6). As shown in FIG. 3, first, second and third grooves 19, 20, 21 for the moderation or control, each of which has a substantially triangular cross section and is associated with the ball 16, are defined in an opposing surface 17b opposite to the top surface of the protrusion 13 in the accommodating portion 50 along the direction indicated by arrow B. As illustrated in FIG. 2, the opposing surface 17b has step 17c which extends along the turning movement of the protrusion 13 and abuts against the ball 16 to thereby restrict the free movement of the protrusion 13 in the left-hand direction (i.e., in the direction indicated by arrow C in FIG. 2), as seen in FIG. 1, at a "HEAD" (FOG) position of the protrusion 13, i.e., the uppermost position of the protrusion 13 as seen in FIG. 1.

The protrusion 13 of the holder 11 is restricted to an axially-extending first position by the restriction portion 17 and the step 17c of the case 9 and is allowed to rotate in the direction indicated by arrow B in FIG. 3. When the ball 16 is successively held in abutment against the first, second and third grooves 19, 20, 21, the holder 11 and the knob 10 are respectively maintained at an "OFF" position, a "PARK" position and the "HEAD" position. When the knob 10 is pulled in the direction (i.e., in the left-hand direction as seen in the axial direction of the shaft 7 in FIG. 1) indicated by arrow C in a state in which the holder 11 and the knob 10 have been maintained at the "HEAD" position as a specific rotational position relative to the first position, the ball 16 passes beyond the step 17c, and the protrusion 13 of the holder 11 enters into the run-off portion 18 so that the holder 11 and the knob 10 are moved to an axially-extending second position.

A guide mechanism 22 for guiding the knob 10 such that the knob 10 can be rotated and moved in the axial direction of the shaft 7, is constructed of the protrusion 13 of the holder 11, the restricting portion 17 and the step 17c of the case 9, and the run-off portion 18.

On the other hand, a control member 23 is mounted to a base end portion 7b of the shaft 7 as shown in FIG. 4. The control member 23 has a spherical control portion 24, which projects downward, and a presser portion 25, whose leading end is spherically formed and which axially extends along the center line of the shaft 7.

A first contact holder 26 for a light switch is disposed on the side of the switch base 1 located in confronting relationship with the control portion 24. The control portion 24 is inserted in a groove 26a defined in the first contact holder 26. The first contact holder 26 is slidable in the direction indicated by arrow D in FIG. 5 and in the direction opposite thereto.

The first contact holder 26 is provided with a moving contact 27 and a fixed contact 28, which is disposed on the switch base 1 side and with which the moving contact 27 is brought into contact and non-contact by the sliding movement of the first contact holder 26. A light switch 29 serving as a first switch is formed by the moving contact 27 and the fixed contact 28. The light switch 29 can be changed to any one of three states of "OFF", "PARK" and "HEAD" in accordance with the sliding movement of the first contact holder 26.

Figure 5:
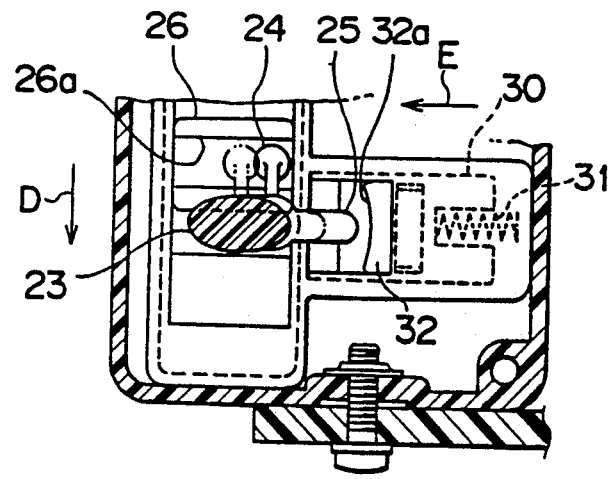
FIG. 5 is a fragmentary transverse sectional view illustrating the lever switch device.

A second contact holder 30 for a fog lamp switch is disposed on the side of the switch base 1 located in confronting relationship with the presser portion 25. In second contact holder 30 can be slid in the left- and right-hand directions as seen in FIGS. 1 and 5, and is urged in the direction indicated by arrow E in FIG. 5 by a compression coil spring 31. A receiving surface 32a of a convex portion 32 is pressed against the leading end of the presser portion 25.

The receiving surface 32a of the convex portion 32 is shaped in the form of a circular arc corresponding to the movement of the presser portion 25 such that the second contact holder 30 is maintained at a given position even if the lever 2 and the control member 23 are rotated.

The second contact holder 30 is provided with a moving contact 33 and a fixed contact 34, which is disposed on the switch base 1 side and with which the moving contact 33 is brought into contact and non-contact by the sliding movement of the second contact holder 30. A fog lamp switch 35 serving as a second switch is formed by the moving contact 33 and the fixed contact 34. The fog lamp switch 35 can be changed to either one of two states, i.e., an ON state and an OFF state, in accordance with the sliding movement of the second contact holder 30.

The operation of the present embodiment will now be described below. When the protrusion 13 of the holder 11 and the knob 10 are placed in the first position and the "OFF" position as indicated by the solid lines in FIG. 1 and 3, the light switch 29 and the fog lamp switch 35 are in the OFF state.

When the knob 10 is rotated in the direction indicated by arrow B in FIG. 3 from this condition and is turned to the "PARK" position, the control member 23 is rotated by the shaft 7 to cause the control portion 24 to slide the first contact holder 26 in the direction indicated by arrow D in FIG. 5, thereby bringing the light switch 29 into the PARK state. As a result, light is emitted by an unillustrated parking lamp. At this time, the second contact holder 30 for the fog lamp switch 35 is not moved, and the fog lamp switch 35 is held off.

When the knob 10 is further rotated in the direction indicated by arrow B from the above "PARK" position and is turned to the "HEAD" position, the first contact holder 26 is slid in the direction indicated by arrow D by the control portion 24 in the same manner as described above so as to bring the light switch 29 to the HEAD state, thereby making it possible to transmit or emit a low beam light from an unillustrated head lamp. In the same manner as described above, the second contact holder 30 is not moved, and hence the fog lamp switch 35 is held off.

When the knob 10 is rotated in the direction opposite to the direction indicated by arrow B from the state in which the knob 10 has been moved to the "HEAD" position, the first contact holder 26 is slid in the direction opposite the direction indicated by arrow D by the control portion 24 so as to successively change the light switch 29 from the HEAD state to the PARK and OFF states.

Figure 6:
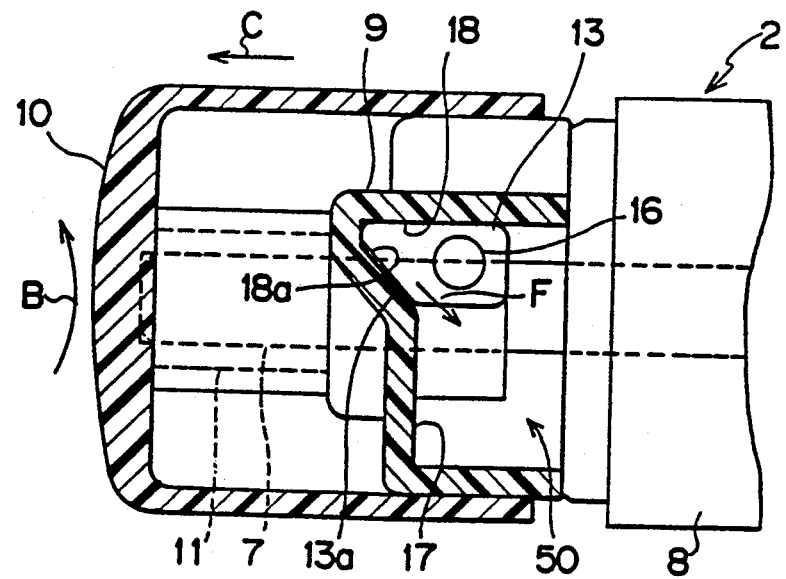
FIG. 6 is a cross-sectional view showing a knob which has been moved to a second position, and corresponding to FIG. 1.

When the knob 10 is pulled from the "HEAD" position in the direction indicated by arrow C, the protrusion 13 of the holder 11 enters the run-off portion 18 to thereby move the holder 11 and the knob 10 to the second position as shown in FIG. 6.

In doing so, the control member 23 is moved by the shaft 7 in the direction indicated by arrow C (see the two-dot chain line in FIG. 4). Therefore, the second contact holder 30, which has been pressed by the presser portion 25 of the control member 23, is slidingly moved in the direction indicated by arrow E by an urging force of the compression coil spring 31. The fog lamp switch 35 is correspondingly turned to the ON state, so that an unillustrated fog lamp lights.

At this time, the control portion 24 of the control member 23 is moved in the direction indicated by arrow C along the groove 26a of the first contact holder 26 as indicated by the two-dot chain lines in FIGS. 4 and 5. However, since the first contact holder 26 is not moved even if the control portion 24 is moved, the light switch 29 remains in the HEAD state. Accordingly, the low beam of the head lamp remains illuminated.

When the knob 10 is pressed in the direction opposite to the direction indicated by arrow C in the state shown in FIG. 6 in which the knob 10 has been moved to the second position, the knob 10 and the holder 11 are moved to the "HEAD" position in the first position.

Thus, the presser portion 25 of the control member 23 is moved by the shaft 7 in the same direction (i.e., in the direction opposite to the direction indicated by arrow C) as the direction of movement of the knob 10 to thereby slide the second contact holder 30 in the direction opposite to the direction indicated by arrow E against the urging force of the compression coil spring 31. The fog lamp switch 35 is correspondingly brought to an OFF state, so that the fog lamp is turned off. At this time, the light switch 29 is maintained at the HEAD state, and hence the low beam of the head lamp is still illuminated.

When the knob 10 is rotated in the direction opposite to the direction indicated by arrow B in the state shown in FIG. 6 in which the knob 10 has been moved to the second position, the protrusion 13 is moved in the direction indicated by arrow F in FIG. 6 by the action of the slanted portion 18a of the run-off portion 18 and the slanted portion 13a of the protrusion 13 of the holder 11. The holder 11 and the knob 10 are thereby moved to the "PARK" position relative to the first position.

As a result, the second contact holder 30 is slid in the direction opposite to the direction indicated by arrow E by the presser portion 25 of the control member 23 to thereby turn off the fog lamp switch 35. In addition, the first contact holder 26 is slid in the direction opposite to the direction indicated by arrow D by the control portion 24 of the control member 23 to thereby change the light switch 29 to the PARK state.

When the lever 2 is rotated in the direction indicated by arrow A and turned about the shaft 3 to a "PASSING" position in the state shown in FIG. 4, an unillustrated passing switch is operated. When the force for actuating the passing switch is released, the lever 2 is automatically returned to the original position.

When the lever 2 is turned to a "HIGH BEAM" position, an unillustrated dimmer switch is changed to a HIGH BEAM state. Even if the force for actuating the dimmer switch is released in this case, the lever 2 is maintained at the "HIGH BEAM" position.

When the lever 2 is rotated in the direction which intersects the direction indicated by arrow A in the state shown in FIG. 4, the lever 2 is turned about the shaft portion 4a of the connecting member 4, so that an unillustrated turn signal switch is actuated.

At this time, the first and second contact holders 26, 30 are not moved even if the lever 2 is rotated in the direction indicated by arrow A, in the direction opposite thereto and in the direction which intersects the direction indicated by arrow A.

According to the present embodiment, as described above, the knob 10 can be pulled in a desired direction and moved to the second position only when the knob 10 has been turned to the "HEAD" position relative to the first position. Thus, when the knob 10 is not in the "HEAD" position, the knob 10 cannot be moved to the second position (the position where the fog lamp is lit). Therefore, the present embodiment can mechanically achieve the control that when the light switch 29 is not in the HEAD state (i.e., when the head lamp is not lit), the fog lamp switch 35 cannot be turned on.

According to the present embodiment as well, when the knob 10 is rotated in the direction opposite to the direction indicated by arrow B in the state in which the knob 10 is in the second position, the knob 10 is moved to the "PARK" position relative to the first position. Thus, when it is desired to change from a state in which the head light and the fog lamp are lit to a state in which only the parking lamp is turned on, a driver can effect this change by operating the knob 10 once. In addition, the present embodiment can also provide a superb operational characteristic.

Figure 7:
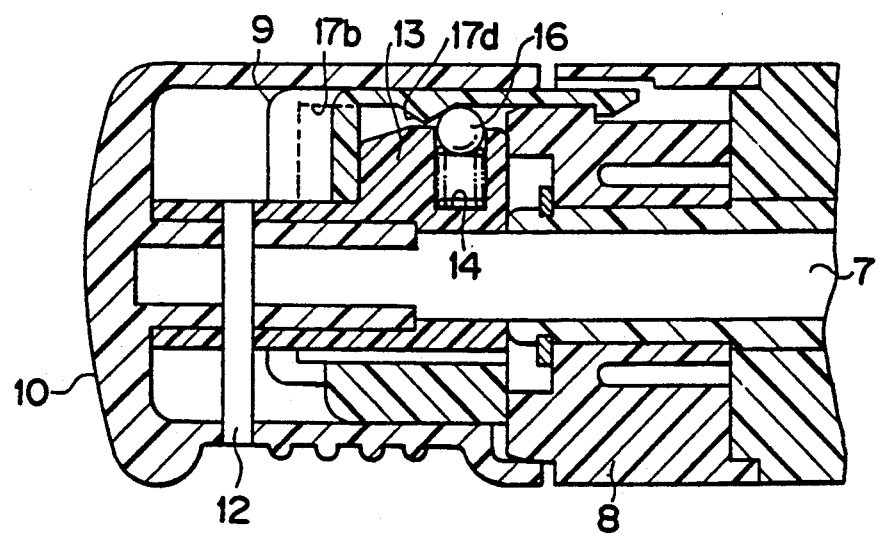
FIG. 7 is a cross-sectional view showing a modification of the first embodiment, and corresponding to FIG. 2.

Incidentally, the above-described embodiment is directed to a case in which the light switch 29 is used as the first switch and the fog lamp switch 35 is used as the second switch by way of example. It is, however, needless to say that the present invention is not necessarily limited to the present embodiment. A modification of the first embodiment will now be described with reference to FIG. 7.

In the description of the modification, the same elements of structure as those employed in the first embodiment are identified by the same reference numerals as those employed in the first embodiment, and their detailed description will therefore be omitted.

In the present modification, a convex portion 17d, which having a substantially triangular cross section, is disposed in a position corresponding to the step 17c as an alternative to the step 17c employed in the first embodiment. Accordingly, the degree of control or moderation at the time of the movement of the knob 10 in the direction indicated by arrow C and in the direction opposite thereto can be improved. In addition, the knob 10 can be held more reliably at the position shown in FIG. 6 (i.e., the fog lamp switch 35 can be reliably held in the ON state).

Having now fully described the invention, it will be apparent to those skilled in the art that many changes and modifications can be made without departing from the spirit or scope of the invention as set forth herein.

What is claimed is:

1. A lever switch device comprising:
a lever;
a shaft defining a longitudinal axis and disposed in said lever for rotation about the longitudinal axis and movable in an axial direction along the longitudinal axis;
a knob mounted on one end of said shaft to rotate and axially move said shaft;
a guide mechanism allowing said knob to rotate when said knob is in a first axial position along the longitudinal axis between a plurality of rotational positions within the first axial position, allowing said knob to move to a second axial position along said longitudinal axis only when said knob is in a first predetermined one of the plurality of rotational positions, and guiding said knob, when said knob is in the second axial position and is rotated, from said second axial position to a second predetermined one of the plurality of rotational positions within the first axial position;
first switching means actuated by said shaft to switch between a first plurality of operational states when said knob is rotated between the plurality of rotational positions; and
second switching means actuated by said shaft to switch between a second plurality of operational states when said knob is moved between said first axial position and said second axial position.

2. The lever switch device of claim 1, wherein said guide mechanism includes a protrusion rotated about the longitudinal axis and moved integrally with said knob, and a defining portion comprising first and second rotation limiting walls defining a range of rotation and movement of said protrusion.

3. The lever switch device of claim 2, wherein said defining portion has a restricting portion abutting against said protrusion preventing movement of said knob into said second axial position when said knob is in a rotational position other than said first predetermined one of the plurality of rotational positions.

4. The lever switch device of claim 3, wherein said defining portion has an accommodating portion for allowing movement of said protrusion along the longitudinal axis to said second axial position when said knob is in said first predetermined one of the plurality of rotational positions, so that at least one portion of said protrusion is accommodated in said accommodating portion.

5. The lever switch device of claim 4, wherein said accommodating portion and said at least one portion of said protrusion have slanted portions respectively, which guide said knob from said second axial position to said second predetermined one of the plurality of rotational positions within said first axial position when said knob is rotated in said second axial position.

6. The lever switch device of claim 1, wherein said guide mechanism maintains the operational state of the first plurality of operational states corresponding to said first predetermined one of the plurality of rotational positions when said knob is moved to said second axial position.

7. The lever switch device of claim 2, wherein a first indexing means between said protrusion and said defining portion provides indexing between the first plurality of operational states upon rotation of said knob.

8. The lever switch device of claim 7, wherein said first indexing means comprises a ball disposed at said protrusion and urged by a biasing means, and a plurality of grooves provided in said defining portion, said ball being fitted into one of the plurality of grooves by the biasing means.

9. The lever switch device of claim 8, wherein a second indexing means between said protrusion and said defining portion provides indexing between a second plurality of operational states when said knob is moved between said first axial position and said second axial position.

10. The lever switch device of claim 9, wherein said second indexing means comprises said ball and a step formed in said defining portion, said ball passing through said step when said knob is moved between said first axial position and said second axial position.

11. The lever switch device of claim 9, wherein said second indexing means comprises said ball and a convex portion formed at said defining portion, said ball passing through said convex portion when said knob is moved between said first axial position and said second axial position.

12. A lever switch device comprising:
a cylindrical body;
a shaft defining a longitudinal axis and accommodated in said cylindrical body for rotation about the longitudinal axis and movable in axial direction along the longitudinal axis;
a knob fixed to one end of said shaft to rotate and axially move said shaft;
a guide mechanism for allowing said knob to rotate when said knob is in a first axial position along the longitudinal axis between a plurality of rotational positions within the first axial position, allowing said knob to move to a second axial position along said longitudinal axis only when said knob is in a first predetermined one of the plurality of rotational positions, and guiding said knob, when said knob is rotated in the second axial position, from said second axial position into a second predetermined one of the plurality of rotational positions within the first axial position;

a first switch actuated by said shaft, switching between a first plurality of operation states when said knob is rotated between the plurality of rotational positions; and a second switch actuated by said shaft when said knob is moved between said first axial position and said second axial position.

13. The lever switch device of claim 12, wherein said guide mechanism includes a protrusion rotatable about the longitudinal axis and movable integrally with said knob, and a defining portion comprising first and second rotation limiting walls defining a range of rotation and movement of said protrusion.

14. The lever switch device of claim 13, wherein said defining portion has a restricting portion abutting against said protrusion preventing movement of said knob into said second axial position when said knob is in a rotational position other than said first predetermined one of the plurality of rotational positions.

15. The lever switch device of claim 14, wherein said defining portion has an accommodating portion for allowing movement of said protrusion along the longitudinal axis to said second axial position when said knob is in said first predetermined one of the plurality of rotational positions, so that at least one portion of said protrusion is accommodated in said accommodating portion.

16. The lever switch of claim 15, wherein said accommodating portion and said at least one portion of said protrusion have slanted portions respectively, which guide said knob from said second axial position to said second predetermined one of the plurality of rotational positions within said first axial position when said knob is rotated in said second axial position.

17. The lever switch device of claim 12, wherein a guide mechanism maintains the operational state of the first plurality of operational states corresponding to said first predetermined one of the plurality of rotational positions when said knob is moved to said second axial position.

18. The lever switch device of claim 17 wherein said guide mechanism further comprises a spherical body movable by said shaft and a plurality of groove portions, each groove portion able to accommodate said spherical body and defined circumferentially about said shaft.

* * * * *